Patented Oct. 18, 1932

1,882,987

UNITED STATES PATENT OFFICE

WALTER SCHUBARDT, OF MANNHEIM, AND LEO SCHLECHT, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF MAKING METAL ARTICLES

No Drawing. Application filed August 26, 1929, Serial No. 388,615, and in Germany September 13, 1928.

The present invention relates to the manufacture of metal articles from scrap metals.

Hitherto the working up of scrap metal and the like has usually been carried out by means of smelting.

We have now found that scrap metals, for example scrap pieces from the stamping of sheet metal, steel turnings and the like, can be advantageously worked up without smelting into shaped metal articles such as ingots, rods, sheets, wires, tubes and the like, by mixing them, if desired after a previous purification and comminution to coarse grains, with metal powder and then subjecting the mixture to sintering treatment. By the term "sintering treatment" we understand a treatment causing the single particles of the metallic powder to combine with each other without melting.

In determining the conditions necessary for said sintering treatment, due regard must be had to the condition, and especially to the condition of the surface, of the particles of the metallic powder to be treated. It will be readily understood that the said particles combine the more readily with each other and with the scrap metal, the less their surface is contaminated, for example with metallic oxides. Even and extremely thin superficial layer of metallic oxides may exert a great influence in this respect. Also the kind of the metal which is to be treated, may be of importance as regards the conditions necessary for sintering.

We have found that sintering can be carried out in different ways.

When employing pure metallic materials, that is such as are free or substantially free from superficial contamination, we may subject them to the action of high temperatures, which treatment should be carried out in an atmosphere of inert or reducing gas in order to avoid oxidation of the metal. In this heat treatment the temperature should be at least 300° centigrade. The time necessary for effecting sintering depends largely on the temperature employed. Thus, when treating iron powder and scrap iron and working at 300° centigrade, the time required will be at least two weeks, when working at 500° centigrade only from 1 to 8 days, and at 700° centigrade only from 3 to 36 hours will be required. The heating to sintering temperature is preferably conducted slowly, in order to prevent the formation of cracks in the mass.

Another way of effecting sintering of such initial materials as are free or substantially free from superficial contamination, comprises subjecting them to the action of very high pressures. The degree of pressure required largely depends on the kind of the metal to be treated. For example, in the case of nickel which rather readily suffers combination of the single particles, a pressure as low as 300 kilograms per square centimeter may be sufficient. However, we prefer to employ higher pressures of the order of several thousand kilograms and may use pressures as high as 16,000 kilograms per square centimeter or even more. Such pressure treatment may be carried out at room temperature..

Generally speaking the aforesaid methods of sintering are useful only when the metallic powder and the scrap metal to be treated are free from superficial contamination. Since such metallic powders are often difficult to prepare and, if once prepared, readily suffer superficial oxidation, we prefer to combine the aforesaid two methods of effecting sintering by subjecting the initial material to the action of both, heat and pressure, and preferably in an atmosphere of reducing gas. For example, the metallic mixture is subjected to a preliminary heat treatment in a reducing atmosphere, for example in a current of hydrogen, and then, with or without cooling, to the action of high pressure. It will, however, be understood that this method may be varied in many ways; for example, the pressing and heating may be carried on simultaneously or pressure applied first, followed by heating and then pressing again. By the last described method it is also possible to work up oxidized scrap materials such as rolling sinter and the like.

The scrap materials can be mixed not only with powders of the same composition but may be mixed with other powdered metals, alloys or other materials, and in this manner, especially when care is taken by heating for a sufficiently long period of time that a sufficient diffusion occurs, alloys of a great variety of kinds may be prepared.

In cases when the comminution of the scrap materials into coarse grains is attended with difficulty these can be converted, by a pretreatment into products which possess a more brittle nature than the initial materials, for example by heating and quenching, or by heating in the presence of ammonia, or nitrogen at about 500° C., or by oxidation or by alloying with metals or metalloids which yield brittle products, and reducing the products after comminution, if necessary.

The following examples will further illustrate the nature of this invention, but the invention is not restricted to these examples.

*Example 1*

The scrap obtained in the manufacture of thin sheet iron is reduced to pieces of from 1 to 3 square centimetres in size and these are mixed with iron powder. The mass is then heated to 950° centigrade in an atmosphere of hydrogen, whereby sintering occurs. The sinter block thus obtained can be worked up into a completely homogeneous sheet by rolling.

*Example 2*

Scrap iron in the form of billets of a diameter of about 15 millimeters obtained when rolling a sintered ingot produced from iron powder obtained by thermal decomposition of iron carbonyl is embedded in and sintered together with iron powder freshly produced from iron carbonyl at about 600° C. and rolled. A perfectly dense and homogeneous material is obtained which is of the same value as regards its composition and its mechanical properties as a material of the same composition and prepared by the usual methods.

What we claim is:—

The process of producing iron articles which comprises subjecting a mixture of scrap iron and iron powder prepared by thermal decomposition of iron carbonyl to a heat treatment at a temperature of about 600° C. and then rolling the sintered material.

In testimony whereof we have hereunto set our hands.

WALTER SCHUBARDT.
LEO SCHLECHT.